(12) United States Patent
Frasher

(10) Patent No.: US 6,499,921 B1
(45) Date of Patent: Dec. 31, 2002

(54) SPOT WELDER TIP SHARPENING AND DRESSING TOOL

(76) Inventor: Robert A Frasher, 3633 Parson Ave., Anchorage, AK (US) 99508

( * ) Notice: Subject to any disclaimer, the term of this patent is extended or adjusted under 35 U.S.C. 154(b) by 0 days.

(21) Appl. No.: 09/957,595

(22) Filed: Sep. 19, 2001

(51) Int. Cl.[7] .................................................. B23C 1/20
(52) U.S. Cl. ..................................................... 409/140
(58) Field of Search ............................... 409/138, 140, 409/139, 181, 175, 137; 219/119; 74/409; 408/211, 203

(56) References Cited

U.S. PATENT DOCUMENTS

| 2,930,289 | A | * | 3/1960 | Swarts | 407/113 |
| 4,762,446 | A | * | 8/1988 | Nishiwaki | 144/30 |
| 4,815,901 | A | * | 3/1989 | Restout | 219/119 |
| 4,865,498 | A | * | 9/1989 | Schoettler et al. | 219/119 |
| 5,332,342 | A | * | 7/1994 | Kizaki et al. | 219/119 |
| 5,333,975 | A | * | 8/1994 | Nishiwaki | 409/132 |
| 6,106,203 | A | * | 8/2000 | Asmis et al. | 409/137 |

FOREIGN PATENT DOCUMENTS

EP       000581316 A1 *  2/1994  .................. 409/140

* cited by examiner

*Primary Examiner*—William Briggs
(74) *Attorney, Agent, or Firm*—Michael J. Tavella

(57) ABSTRACT

A powered rotary drive unit for dressing electrodes that has two handles. The operator places the cutters between the electrodes and applies clamping pressure. The operator then activates the motor to dress the electrodes. The cutter is designed to cut the electrodes to the proper shape so that the tips cannot be over-dressed. Moreover, the two handles insure that the cutters remain level during the entire dressing operation. Finally, the cutters are ground to a specific angle that improves the performance of the welder by flattening the tips to an optimum angle.

11 Claims, 5 Drawing Sheets

SPOT WELDER TIP SHARPENING AND DRESSING TOOL

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to spot welder tip sharpening and dressing tools and particularly to spot welder tip sharpening and dressing tools that are hand held.

2. Description of the Prior Art

Spot welding machines have been used for years to make simple, fast welds in metals. These machines range from small welders typically handled by one or two people to huge robotic machines that can weld large workpieces. Despite the differences in size, all electric spot welders work on the same basic principal: a pair of electrodes positioned to allow a workpiece to be positioned between them. A mechanism causes the electrodes to be brought together. Electric current then flows between the electrodes and the workpiece causing the metal at that point to be fused. The electrodes are released and the workpiece can be removed.

The electrodes used in spot welding are typically copper. They are formed into a point that has a slightly rounded tip. After a certain number of welds, the tips of the electrodes become worn and flattened. When this happens, the electrodes are no longer able to "spot" the electric current in a small enough space to form a good weld. Although electrodes can be replaced once this happens, replacement becomes costly, especially when the electrodes last for only 50 or 60 welds. To prolong the use of the electrodes, the tips can be sharpened and dressed. In small shops, this process involves using a file to hand-shape the electrode tips. This not only takes time; it also takes a degree of skill. The electrodes must be sharpened to the right angle and symmetrically for optimum performance. If the job is done poorly, the electrodes may be ruined and have to be discarded.

For larger machines, hand dressing is impractical. These machines often run 24 hours a day and require several dressings. Several machines have been developed to address this need. For example, U.S. Pat. Nos. 5,993,125, 6,195,860, 6,106,203, 5,332,342, 5,288,185, 4,610,153 and 4,966,506, teach complex devices for dressing electrode tips. These machines have a cutting element that is secured in a drive mechanism. This cutting element is then used to dress the tips in large and robotic spot welding machines. These devices are not intended for use on small welders, such as those found in small sheet metal shops.

U.S. Pat. Nos. 4,966,504, 4,921,377, and 4,856,949, teach tools that can be used to dress electrode tips. These tools are typically a set of cutters placed in a holder that is then turned by some mechanical means. The shape of the cutters is designed to permit both electrodes to be dressed simultaneously. These cutters are typically designed to be used in the machines discussed above. However, they could be used in smaller devices provided a proper drive system was used.

One U.S. Patent appears to be directed to small welding machines. U.S. Pat. No. 4,578,005 teaches a manual type tool. This tool has a long handle, like a wrench. It has a head that contains the cutting tools. The head is ratcheted within the handle. The cutters have edges on both top and bottom so that both electrodes can be dressed simultaneously. The tool is used by placing it between the electrodes, clamping the electrodes together and then turning the handle. Because of the ratchet, the head turns in one direction only. The tool is thus manipulated until the desired degree of dressing is established.

There are some problems with this tool. First, the tool must be held level to obtain a proper tip formation. Because a single handle is used to hold the cutters, it is very difficult to ensure the cutter head remains truly level with respect to the electrodes. Moreover, the use of the manual drive not only increases the time involved, but also increases the risk that the electrodes will be either over dressed or under-dressed.

Thus, a small serviceable tool for dressing electrode tips on small welders is needed.

BRIEF DESCRIPTION OF THE INVENTION

The instant invention overcomes all of the difficulties mentioned above. It is a powered rotary drive unit that has two handles. The operator places the cutters between the electrodes and applies clamping pressure. The operator then activates the motor to dress the electrodes. The cutter is designed to cut the electrodes to the proper shape so that the tips cannot be over-dressed. Moreover, the two handles insure that the cutters remain level during the entire dressing operation. Finally, the cutters are ground to a specific angle that improves the performance of the welder by flattening the tips to an optimum angle.

DETAILED DESCRIPTION OF THE INVENTION

Figure 1:
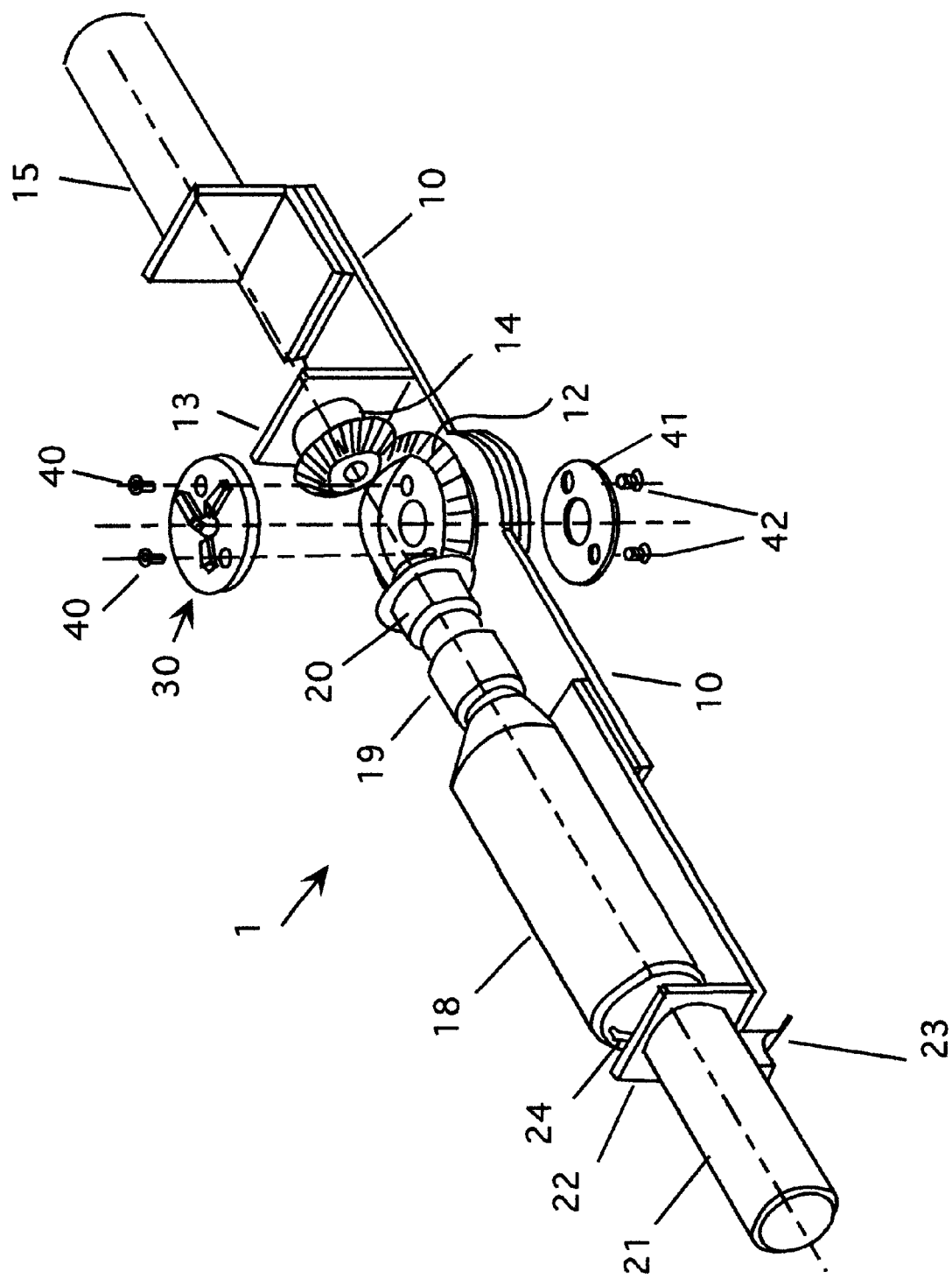
FIG. 1 is a partially exploded perspective view of the invention.
Figure 2:
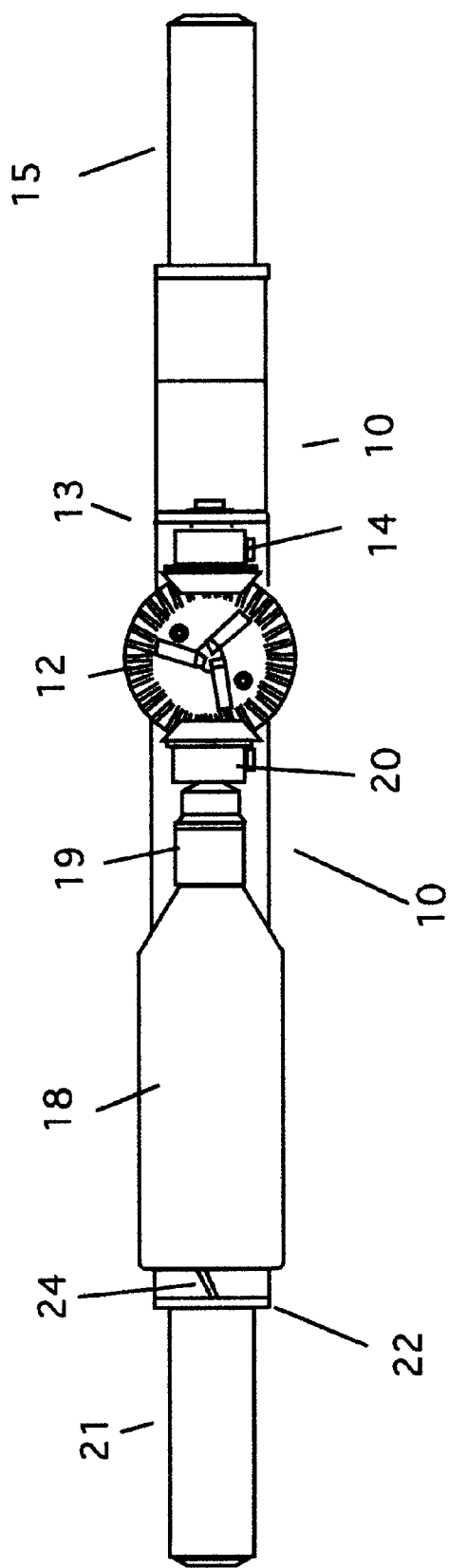
FIG. 2 is a top view of the invention.
Figure 3:
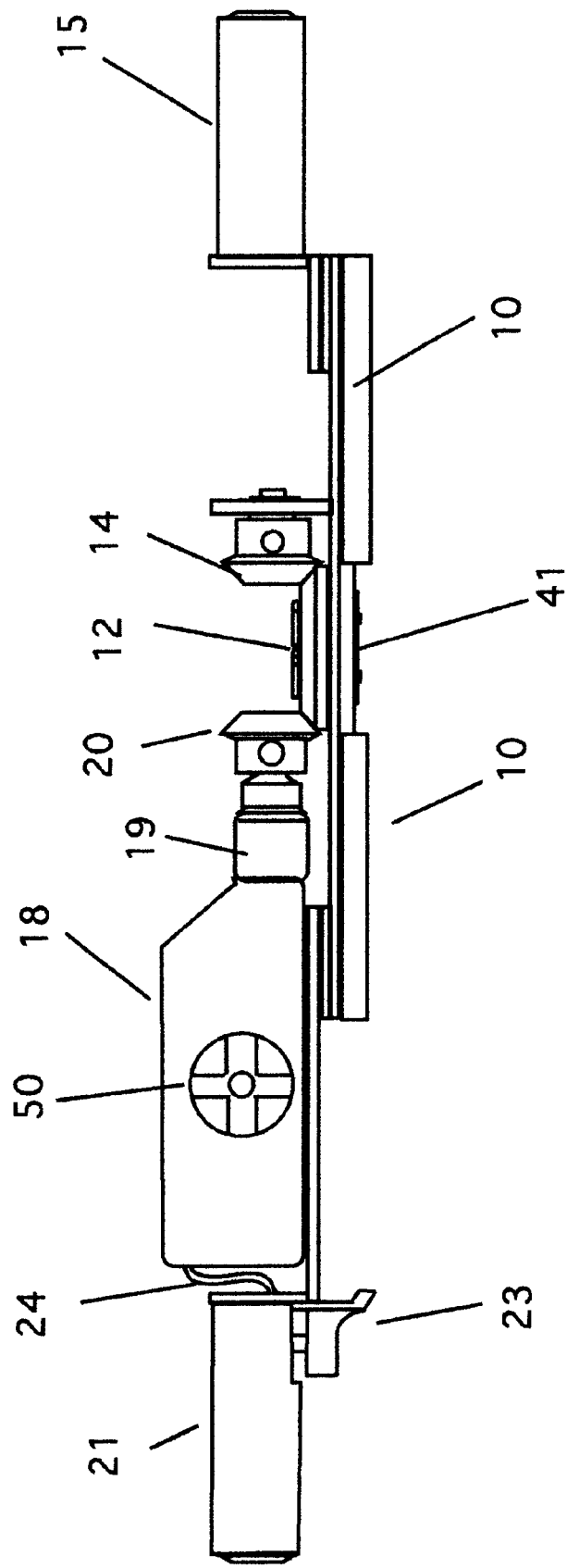
FIG. 3 is a side view of the invention.

Referring now to FIGS. 1, 2 and 3, the device has a base 10 on which the components that make up the device sit. The base 10 has two wings that extend outward from a center annular frame that holds the cutter head 30. The top surface of the annular frame has a set of beveled gear teeth 12. On the right side of the base is a mounting 13 for a drive gear 14. This gear is not directly powered, but provides additional support and momentum for the cutter head as it turns. A handle 15 is also attached to this side of the base as shown.

On the left side of the base is a motor 18 that has a drive shaft, which is coupled to a drive head 20 by coupler 19. The motor 18 is fixed to the base. In the preferred embodiment, the motor 18 is a variable speed, reversible type. Of course, neither of those features is required for the basic operation of the device.

At the end of the left side of the base is a second handle 21, which is secured to a vertical support 22. An operating switch 23 is mounted under the base on the left side as shown. The switch is connected to the motor by wires 24. Note that the switch can be either a snap type on-off switch or a momentary contact type.

FIG. 3 also shows a preferred accessory. A level 50 is placed on the device, either on the handles or, as preferred, the motor, as shown. The level is used to ensure the device is both level and plumb before activating the cutters. In this way, the user ensures that the electrodes are sharpened to the proper angles. If the device is not level and plumb, the electrodes will be sharpened at the wrong angles, the angles will be offset. This is because the device sharpens from the top and the bottom. A pair of electrodes thus sharpened will not last for any length of time. Placing the level on the device ensure proper sharpening of the electrodes in every operation.

The drive head 20 is a bevel gear that meshes with the gear teeth 12 on the annular frame. The drive gear 20 turns the cutter head when the motor is activated.

Figure 4:
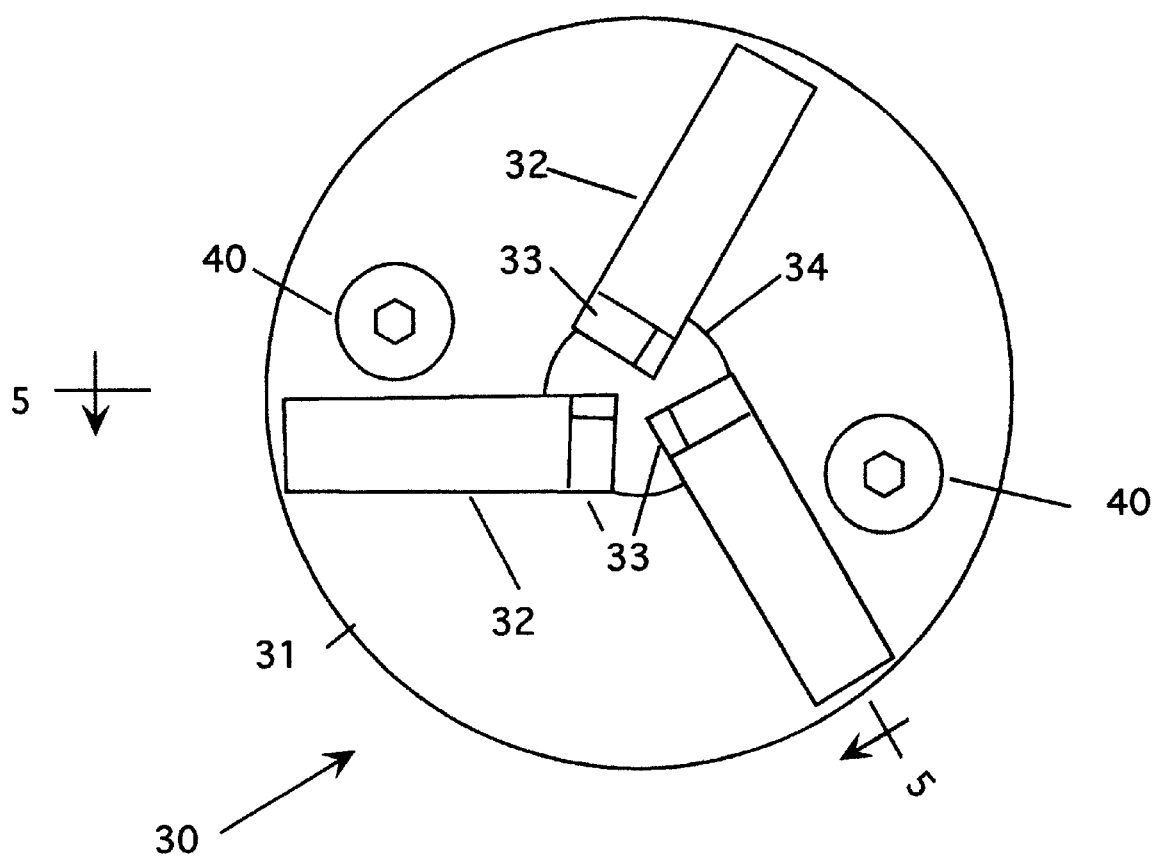
FIG. 4 is a top detail view of the cutter head.
Figure 5:
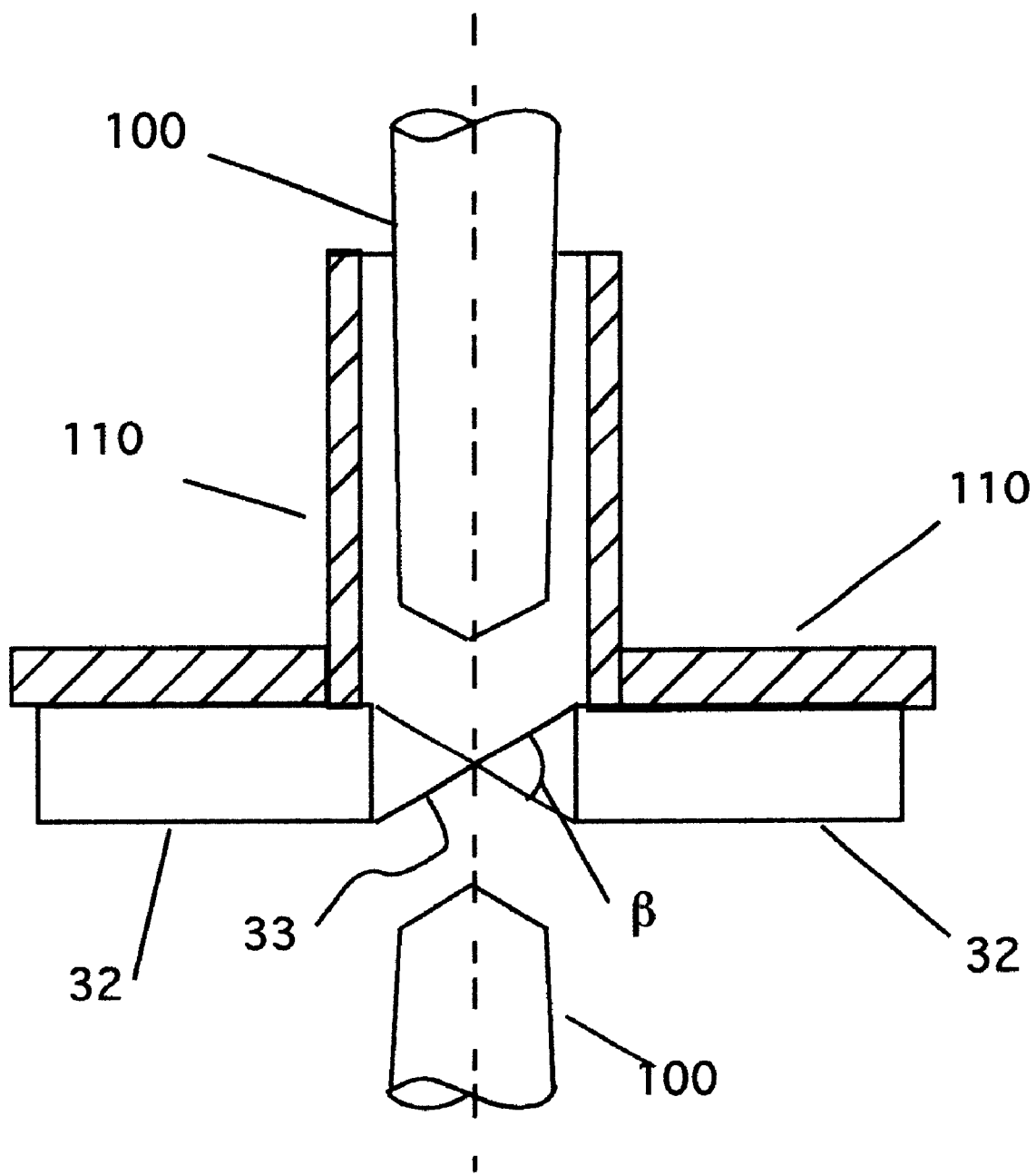
FIG. 5 is a sectional view of the cutter head taken along the lines 5—5 of FIG. 4.

Referring now to FIGS. 1 and 4, and 5, details of the cutter head are shown. As shown in FIG. 1, the cutter head 30 is a disk 31 that has three slots to hold the cutters 32. The disk 31 fits into a recess in the annular frame and is secured by fasteners 40. Note that an under support plate 41 is attached to the bottom of the device by two screws 42 as shown in FIG. 1.

As shown in FIG. 5, the cutters 32 are positioned at 120° around the cutter head plate 31. The center 34 of the plate 31 is open to permit the welding electrodes to enter the cutting space for dressing.

FIG. 5 shows the cutters 32 in position with respect to the electrodes 100. They are mounted in the welder frame 110. In this figure, the electrodes 100 have already been dressed. Note the shallow angle formed at the tip. In the preferred embodiment, this angle is 30 degrees. This is obtained by forming the cutter tips 33 with a 60° angle β as shown in FIG. 5, which can be viewed as two "V" shaped sections of 30 degrees each. The shallow angle of the electrodes produces a good welding profile that lasts a long time, thus reducing the need for frequent dressing operations.

Of course, the cutters 32 are not shown of any specific size. The cutter size is dependent on the size of the electrodes and the overall size of the device. Different size cutter heads may be used by replacing one head for another, as discussed above. The key to the cutters, regardless of size is the tip angle β as discussed above.

As discussed above, this device has two handles 15 and 21. The use of two handles allows the operator to hold the tool level to form the proper electrode profile. Moreover, the switch 23 on the handle allows the operator to operate the controls easily, for proper operation.

As noted above, the cutters 32 secured to the cutter head disk 31. When the cutters become worn, the disk can quickly be removed and a new cutter head can then be installed.

In use, the device is positioned with the electrodes 100 above and below the cutter head. With the welder deenergized, the operator engages the operating pedal on the welder, which causes the electrodes to be brought together. When the electrodes are in the full operating position, the operator turns on the switch on the handle of the device, which causes the cutter to turn. The cutters then dress the electrodes for further operation. As noted above, the cutters are designed to form the electrodes with the optimum angle automatically, for good welds.

If the cutters become worn, the cutter plate can be changed easily. Two screws 40 (see FIG. 1) hold the cutter plate in place. This entire plate is removed and replaced with a new cutter that has sharp cutters. The plate is installed and the screws are replaced in a matter of minutes. Because the cutters are attached to the plate, their alignment is assured and no adjustments are necessary for the cutters to work properly after they are installed.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A powered dressing tool for electrodes comprising:
    a) a base frame, said base frame having a circular opening;
    b) a first handle attached to said base frame and extending outwardly therefrom;
    c) a second handle, being oppositely disposed from said first handle on said base frame, and also extending outwardly therefrom;
    d) a motor, having a drive shaft, attached to said base frame;
    e) a first bevel gear, rotatably installed in said circular opening in said base frame, said first bevel gear having a cylindrical recess formed therein;
    f) a cutter head, removably installed in said cylindrical recess in said first bevel gear; and
    g) a second bevel gear, attached to said drive shaft, whereby said second bevel gear is in rotatable communication with said first bevel gear.

2. The powered dressing tool of claim 1 wherein means for operating said motor are installed on said first handle.

3. The powered dressing tool of claim 1 wherein the means for operating said motor comprises a switch.

4. The powered dressing tool of claim 1 wherein the means for operating said motor comprises a momentary contact switch.

5. The powered dressing tool of claim 1 wherein the cutter head comprises:
    a) a base plate;
    b) three cutters fixedly attached to said base plate; and
    c) a means for attaching said cutter head to said base frame.

6. The powered dressing tool of claim 5 wherein the three cutters are spaced about said base plate at an angular displacement of 120 degrees.

7. The powered dressing tool of claim 5 wherein each of said three cutters has a head, and further wherein the head of each of said three cutters forms an angle with respect to a longitudinal line drawn through the center of each of said three cutters.

8. The powered dressing tool of claim 7 wherein the angle formed by each of said heads is 30 degrees.

9. The powered dressing tool of claim 1 further comprising a level, operably installed in said motor for viewing by an operator to ensure the powered dressing tool is held on a level plane.

10. The powered dressing tool of claim 1 wherein the motor is a variable speed motor.

11. The powered dressing tool of claim 1 wherein the motor is reversible.

\* \* \* \* \*